United States Patent
Du et al.

(10) Patent No.: US 9,568,489 B2
(45) Date of Patent: Feb. 14, 2017

(54) THREE-DIMENSIONAL FLOW VELOCITY VECTOR, ENERGY AND MASS GAUGE

(71) Applicant: NANJING EMPERODAM CO., LTD., Nanjing, Jiangsu (CN)

(72) Inventors: Guoping Du, Nanjing (CN); Jiajia Du, Nanjing (CN); Xiaofeng Song, Nanjing (CN); Guanglin Du, Nanjing (CN)

(73) Assignee: NANJING EMPERODAM CO., LTD., Nanjing (CN)

( * ) Notice: Subject to any disclaimer, the term of this patent is extended or adjusted under 35 U.S.C. 154(b) by 131 days.

(21) Appl. No.: 14/403,031

(22) PCT Filed: Jun. 25, 2013

(86) PCT No.: PCT/CN2013/077911
§ 371 (c)(1),
(2) Date: Nov. 21, 2014

(87) PCT Pub. No.: WO2014/139236
PCT Pub. Date: Sep. 18, 2014

(65) Prior Publication Data
US 2015/0160091 A1    Jun. 11, 2015

(30) Foreign Application Priority Data
Mar. 11, 2013  (CN) .......................... 2013 1 0076423

(51) Int. Cl.
*G01P 5/24*  (2006.01)
*G01F 1/66*  (2006.01)
(Continued)

(52) U.S. Cl.
CPC ................. *G01P 5/24* (2013.01); *E02D 1/027* (2013.01); *G01F 1/66* (2013.01); *G01F 1/662* (2013.01);
(Continued)

(58) Field of Classification Search
CPC ............ E02D 1/027; G01F 1/66; G01F 1/662; G01F 1/663; G01P 5/24; G01P 5/241; G01P 5/245; G01P 13/045
See application file for complete search history.

(56) References Cited

U.S. PATENT DOCUMENTS 3,603,145 A * 9/1971 Morris .................. E21B 47/101
73/152.32
2010/0258303 A1* 10/2010 Alberty .................. E21B 47/10
166/244.1

FOREIGN PATENT DOCUMENTS

CN     201974527 U     9/2011
CN     102445307 A     5/2012
(Continued)

OTHER PUBLICATIONS

Du et al; "The application of the tracing technology in the leakage beneath the dam of reservoir," Groundwater; Dec. 1998; vol. 20; No. 4; pp. 172-177.
(Continued)

*Primary Examiner* — Paul West
(74) *Attorney, Agent, or Firm* — Oliff PLC

(57) ABSTRACT

A three-dimensional flow velocity vector, energy and mass gauge is provided, wherein it comprises an elastic leather cover, both ends of which are mounted with a rigid sealing plug, separately, the elastic leather cover and the rigid sealing plug forming a cylindrical sealing cavity, in which a cable connecting line hole is installed on the upper rigid sealing plug, while an injection hole for injecting liquid into the cylindrical sealing cavity, on which a sealing plug is provided, is installed on the lower rigid sealing plug; and a measuring device for measuring the flow velocity vector and energy and a device for measuring the mass are installed in the cylindrical sealing cavity. The gauge has the advantages
(Continued)

of a simple structure, convenient manufacturing and comprehensive detection.

9 Claims, 3 Drawing Sheets

(51) Int. Cl.
  *E02D 1/02*   (2006.01)
  *G01M 3/32*   (2006.01)
  *G01P 5/14*   (2006.01)
  *G01P 13/04*  (2006.01)
  *G01K 7/02*   (2006.01)
  *G01K 7/22*   (2006.01)
  *G01K 7/24*   (2006.01)
  *G01M 3/24*   (2006.01)

(52) U.S. Cl.
  CPC .............. G01F 1/663 (2013.01); G01K 7/02 (2013.01); G01K 7/22 (2013.01); G01K 7/24 (2013.01); G01M 3/24 (2013.01); G01M 3/3254 (2013.01); G01P 5/14 (2013.01); G01P 5/241 (2013.01); G01P 13/045 (2013.01)

(56) References Cited

FOREIGN PATENT DOCUMENTS

| | | |
|---|---|---|
| CN | 102721722 A | 10/2012 |
| CN | 202471203 U | 10/2012 |
| CN | 103148992 A | 6/2013 |
| JP | 2000230879 A | 8/2000 |
| JP | 2004226330 A | 8/2004 |

OTHER PUBLICATIONS

Translation of Dec. 26, 2013 International Search Report issed in International Patent Application No. PCT/CN2013/077911.

* cited by examiner

Accompanying drawings of the specification

THREE-DIMENSIONAL FLOW VELOCITY VECTOR, ENERGY AND MASS GAUGE

TECHNICAL FIELD OF THE INVENTION

The invention relates to a civil engineering detecting apparatus, in particular to energy and mass detecting apparatus for the underground water flow velocity mass point movement, specifically to a three-dimensional flow velocity vector, energy and mass gauge.

BACKGROUND OF THE INVENTION

It is known that all the infrastructure constructions of the civil engineering relate to two important influence factors, namely, the interaction of water and rock and soil. The former dynamically and actively etches the footstone of the underground engineering construction in an ever-present way; the latter statically and passively resists and prevents the etching and damage from the former. A complete and efficient monitoring mechanism should be established in order that both of them realize peaceful coexistence and a long period of stability. For this reason, the invention proposes to establish a prediction and forecast system which is implemented to quantify the underground concealed work due to the migration of the building substances caused by flow velocity vector field according to the energy and mass conservation principle.

French engineer H.-P.-G. Darcy first proposed an experimental law of the leakage rule of water in the rock-soilvoid through the indoor experiment in 1856, thereby establishing the theory of the underground water leakage dynamics. However, the theory appears mainly as the leakage coefficient K value in the civil engineering application. To obtain the value in conventional methods, engineers can obtain the leakage characteristics of the individual samples through the indoor leakage experiment mainly by sampling the soil, but cannot acquire the real leakage from the in-situ status. Consequently, all the important engineering constructions require the on-site hydrogeological pumping experiment. Since French engineer J. Dupuit established "Dupuit pumping experiment theory" in 1863, for the 150 years, it has formed a legality that hydrogeological parameters as the authorized engineering design basis are obtained on the site of the experiment. With the rapid advancement of the modern civil engineering construction, such experiment cannot meet the need of the production practice. It is known that due to the defect of the "Dupuit pumping experiment theory" itself and the extremely high requirement for the experiment operators, there are fewer and fewer such experiments. Above all, this experiment only obtains the comprehensive physical property leakage index of each sequence of the rock and soil under the artificial disturbance flow field, namely, the balance amount of rock and soil pore volume and pumping volume, but cannot obtain the leakage velocity field and vector field of the underground water in the natural flow field. Therefore, it cannot solve many critical technology issues on leakage that the civil engineering meets. German scientist Moser proposed a diluting logging method of utilizing the isotope to track and measure water-containing layer leakage flow velocity for the first time in 1957. Since it is capable of measuring the leakage flow velocity, flow direction and vertical flow of the water-containing layer underground water in a single well under the natural flow field, what's more, its cost is lower than that of the pumping experiment and it is easy to implement, it is widely concerned and used by hydrogeologists in the world, and therefore, many available devices for measuring the flow velocity and flow direction of the underground water are created. A rod connecting directional probe emerged first; later, Polish I. B. Hazza invented a P-32 absorption and X film directional velocity measurement device; Japanese Toshiro invented a three-layer isotope dilution chamber directional velocity measurement device; W. Drost and Kiotz, etc., designed a cotton yarn absorption direction-finding and active carbon absorption direction-finding device; U.S. Pat. No. 4,051,368, British Patent 2009921 and 1598837 introduced a neutron activation direction-finding and velocity measurement device; in Germany Munich hydrogeological lab, W. Drost measured a novel tracking probe for measuring the flow velocity and flow direction of the underground water in 1982; Chinese Patents: including an intelligent single well underground water dynamic parameter tester 98111509.8, as well as a thermoluminescence and ionization chamber isotope tracking and measuring device introduced in patents 85107160 and 86104175, etc. Although the above inventions reach the requirement of measuring the flow velocity and flow direction of the underground water, in the practical application, they relate to the defects and negative effects, such as the influence of radionuclide substances on human body and environment, so that many countries and governments inhibit the use of them or have a conditionally limited use in the strict monitor so that they cannot be promoted and applied in the production practice.

The underground water can move because of two most basic conditions: one is to have the active energy (hydraulic head pressure difference) effect, and the other is that the passive water blocking medium should have a pore. They are a pair of technical carriers with unity of opposites. Although there are different testing methods, the conventional pumping water experiment is to research the leakage characteristics of water blocking medium with a passive method, namely, the perfect degree of the geologic structure system, while the active "energy and mass leakage measuring method" mainly discloses the migration of the leakage mass point of the underground water and its distribution size of energy and mass in the time and space. The sonar probe array is capable of exactly measuring the size and distribution of the energy transfer of the sound wave in the fluid, and can analyze the velocity and the vector direction of the flow velocity mass point movement in accordance with the time and space distribution of the measuring data of the sonar probe array; the conduction, temperature, pressure, etc., can track and monitor the space distribution of the degree of mineralization, salinity, volume-weight of water, temperature and other mass quantitative indexes of the water entity of the flow velocity mass point in real time when being driven by the energy. When the flow velocity vector of the underground water synchronously measured on the site and in situ and the increment of chemical substances in the water body driven by the flow velocity vector change, a series of critical technical issues to be addressed in the civil engineering leakage are quantitatively solved from the monitor of the energy and mass variation. Before destructive hidden danger appears in the underground engineering, it makes prediction and forecast and takes preventive measures.

There are issues, such as leakage of reservoir dams, piping leakage of river dams, water-stop structure mass detection of the underground continuous wall bodies, underground water solute transport and diffusion measurement, etc. In Chinese Patents: single well underground water flow velocity and flow direction and reservoir leakage point measuring method and its device (Application No.

201110295635.5), although it has provided the water flow mass point movement velocity and vector, it cannot check whether substances of the rock-soil body water blocking medium are taken out when the rock-soil body is being driven by the flow velocity vector and energy. This needs to be able to quantize the atomic and molecular structure index in a microcosmic way before people can visually test that substances of fine particles are taken out. It completely eradicates the occurrence of the underground engineering hidden danger and benefits mankind.

SUMMARY OF THE INVENTION

The object of the invention is to design a three-dimensional flow velocity vector, energy and mass gauge, which is capable of tracking the variation of the mass of the rock and soil substance based on the movement energy of the underground water flow velocity vector mass point, aiming at the fact that the existing underground water leakage gauge cannot measure and reflect the change of the microcosmic performance in time and cannot find the potential safety hazard in the leakage environmental change in time.

The technical scheme of the invention is:

A three-dimensional flow velocity vector, energy and mass gauge, wherein it comprises:

an elastic leather cover 1, both ends of which are mounted with a rigid sealing plug 2 separately, the elastic leather cover 1 and the rigid sealing plug 2 forming a cylindrical sealing cavity, in which a cable connecting line hole is installed on the upper rigid sealing plug, while an injection hole for injecting liquid into the cylindrical sealing cavity, on which a sealing plug is provided, is installed on the lower rigid sealing plug;

a flow velocity vector and energy measuring device 12, which is installed in the above-mentioned cylindrical sealing cavity, and is electrically connected with a computer 8 with a GPS locator 9 via a cable connecting line, obtaining the flowing direction and velocity of underground water by sending the flow sonar obtained by measurement to the computer, thereby determining the flowing vector and energy of underground water; and a leakage point mass measuring device 14, which is installed on either or both external surfaces of the above-mentioned two rigid sealing plugs 2, and is electrically connected with the above-mentioned computer 8 via a connecting cable, wherein it determines whether there is loss of water-blocking medium of rock-soil body for the measured point by measuring the change in conductivity and temperature in the underground water and makes timely judgment for the safety of the leakage point.

The flow velocity vector and energy measuring device 12 comprises:

an upper sonar sensor 3 and a lower sonar sensor array 4, wherein the lower sonar sensor array 4 is used for determining the direction of sound source, and the upper sonar sensor 3 and the sonar sensor which receives the sound source first in the lower sonar sensor array 4 are used for determining the time difference in which the sound source reaches the gauge together;

a course locator 5, which is used for calculating the measuring strength based on the sonar sensor which senses a sound source signal first in the lower sonar sensor array 4 and other nearby sonar sensors in the same array, obtaining the movement direction of the flow vector relative to the gauge, overlapping the measured movement direction of the flow and the geographical North Pole measured by the magnetic course, and obtaining the movement geographical direction of the flow; thereby determining the flow velocity vector measuring position of the next point;

a pressure sensor 6, which is installed in the cylindrical sealing cavity for determining the depth of the water level in which the gauge is located so as to determine the position of the gauge; and an electronic signal processing system 7, which is used for receiving the upper sonar sensor 3, the lower sonar sensor array 4, the course locator 5, the pressure sensor 6, a conductive electrode sensor 10 and a temperature sensor 11, the original signal obtained by measurement being converted into the digital signal, being sent to the ground-based computer 8 via the cable for processing, and thereby obtaining the flowing direction and velocity of the underground water of the measuring point.

The course locator 5 is a compass, a magnetic sensor, a gyroscope or an electronic gyroscope.

The leakage point mass measuring device 14 comprises:

a conductive electrode sensor 10, which is located on the external surface of the rigid sealing plug 2 and is capable of being in contact with the measured water body so as to send the conductivity and the salinity in the measured water body to the computer 8; and a temperature sensor 11, which is also located on the external surface of the rigid sealing plug 2 and is capable of being in contact with the measured water body so as to directly send the temperature value in the measured water body to the computer 8, the computer 8 obtaining the mass change of the measuring point based on the change in the measured conductivity and temperature change, wherein if the change rate is larger than a certain value, the leakage deteriorates in the surface measuring point, and a corresponding leaking stoppage measure should be taken to take preventive measures.

The leather cover 1 should use the leather material similar to the propagation velocity of wave velocity of the water body and has an insulating and solid performance.

The liquid injected in the leather cover 1 should be similar to the propagation velocity of wave velocity of the water body and be insulating and non-conductive.

There are at least three sonar sensors in the lower sonar sensor array 4, which are uniformly distributed along the edge of the same circumferential plane.

The conductive electrode sensor 10 is a graphite, stainless steel, titanium alloy or platinum electrode sensor.

The temperature sensor 11 is a thermocouple, a thermistor, a resistance temperature detector (RTD) or an IC temperature sensor.

The beneficial effect of the invention lies in the fact that:

The invention has solved the most basic design factor of the leakage mass point movement of the underground water that is needed emergently in the underground engineering practice because it can accurately measure the horizontal flow velocity and vertical flow velocity and its vector at any space point of the underground water and provide various hydrogeological parameters necessary for the underground engineering.

The invention has solved various hydrogeological engineering leakage schemes related to the underground engineering leakage that are very useful for the national economy. The sonar leakage probing technology is revolutionary upgrade and creative substitute products that track and measure crisis of isotope. It has the application features of being accurate in measurement, high-efficient, environment-friendly and convenient. It has a wide application prospect and has made significant application effects in development of water conservancy, hydropower and geothermal energy, the site selection of waste repository, geological disaster evaluation, subway leakage monitoring, oil pipeline hydrogeological survey, foundation pit water blocking wall quality detection and other fields.

The invention not only can obtain hydrogeological parameters, but also can find the leakage point of piping leakage of reservoir dams and river dams, determine the leakage point fast and accurately, find the potential safety hazard timely and take preventive measures.

The invention has made the position relationship of various detecting components in the leather cover clear, and creatively connects GPS and a computer directly. It has the advantages of being simple in structure and convenient to manufacture.

Through the measurement of the conduction, temperature, pressure, etc., the invention can track and monitor the space distribution of the degree of mineralization, salinity, and volume-weight of water, temperature and other mass quantitative indexes of the water entity of the flow velocity mass point in real time when being driven by the energy. When the flow velocity vector of the underground water synchronously measured on the site and in situ and the increment of chemical substances in the water body driven by the flow velocity vector change, a series of critical technical issues to be addressed in the civil engineering leakage are quantitatively solved from the monitor of the energy and mass variation. Before destructive hidden danger appears in the underground engineering, it makes prediction and forecast and takes preventive measures, such as leakage of reservoir dams, piping leakage of river dams, water curtain-stop structure mass detection of the underground continuous wall bodies, underground water solute transport and diffusion measurement, etc.

The invention realizes the predictive and forecasting purpose of quantifying the underground concealed work timely due to the migration of the building substances caused by flow velocity vector and mass from the point of the energy and mass conservation principle, which not only can find the leakage point timely, but also can timely monitor whether leakage substances flow out of the leakage point. This provides basis for decision making for timely finding and preventing the deterioration of the leakage point. It can prevent the occurrence of the dam break, wall collapse and other serious accidents.

The invention has a simple structure, convenient manufacturing and comprehensive detection.

DETAILED DESCRIPTION OF THE INVENTION

The invention is further described in combination with the accompanying drawings and embodiments.

Figure 1:
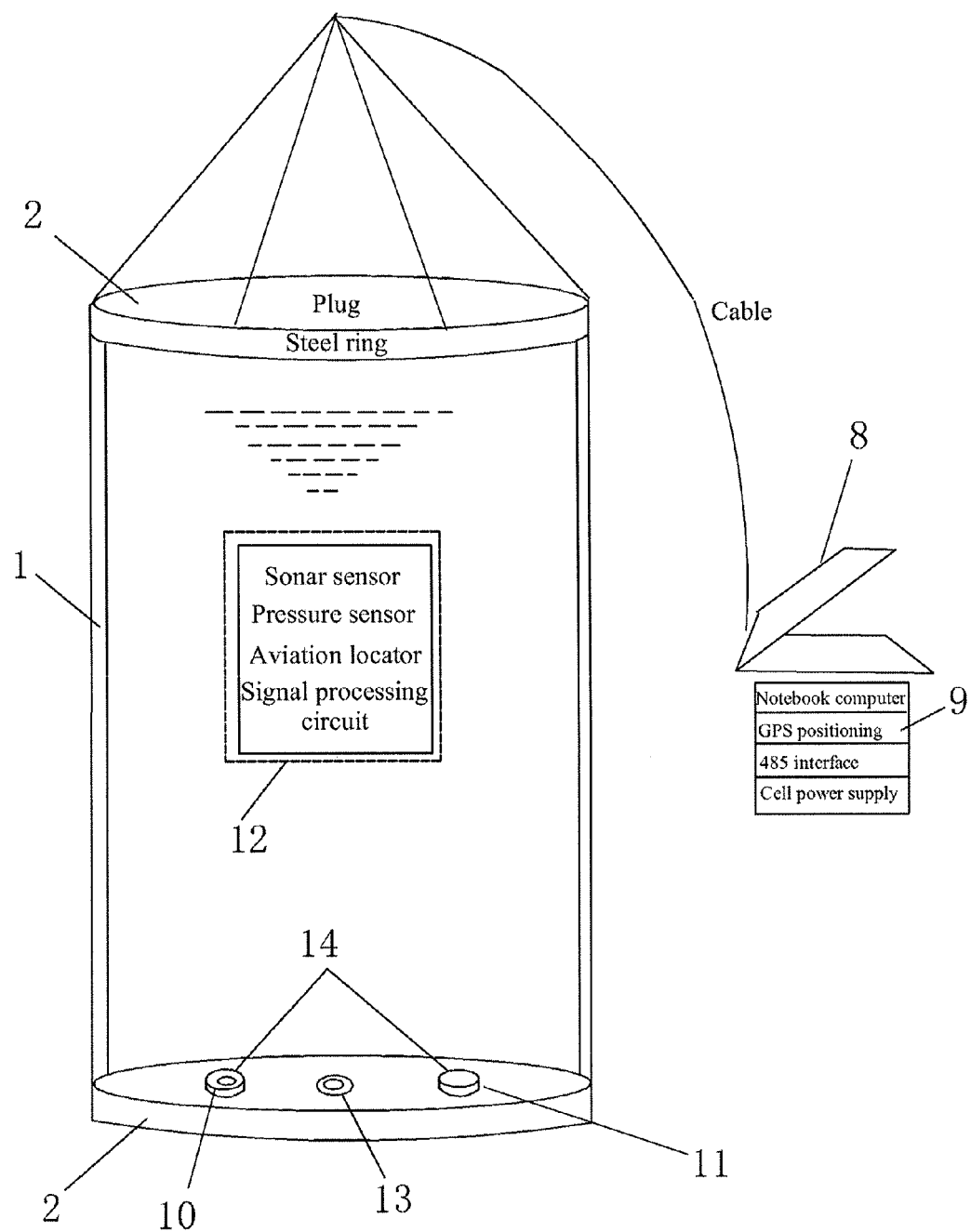
FIG. 1 shows a structural schematic diagram of the invention.
Figure 2:
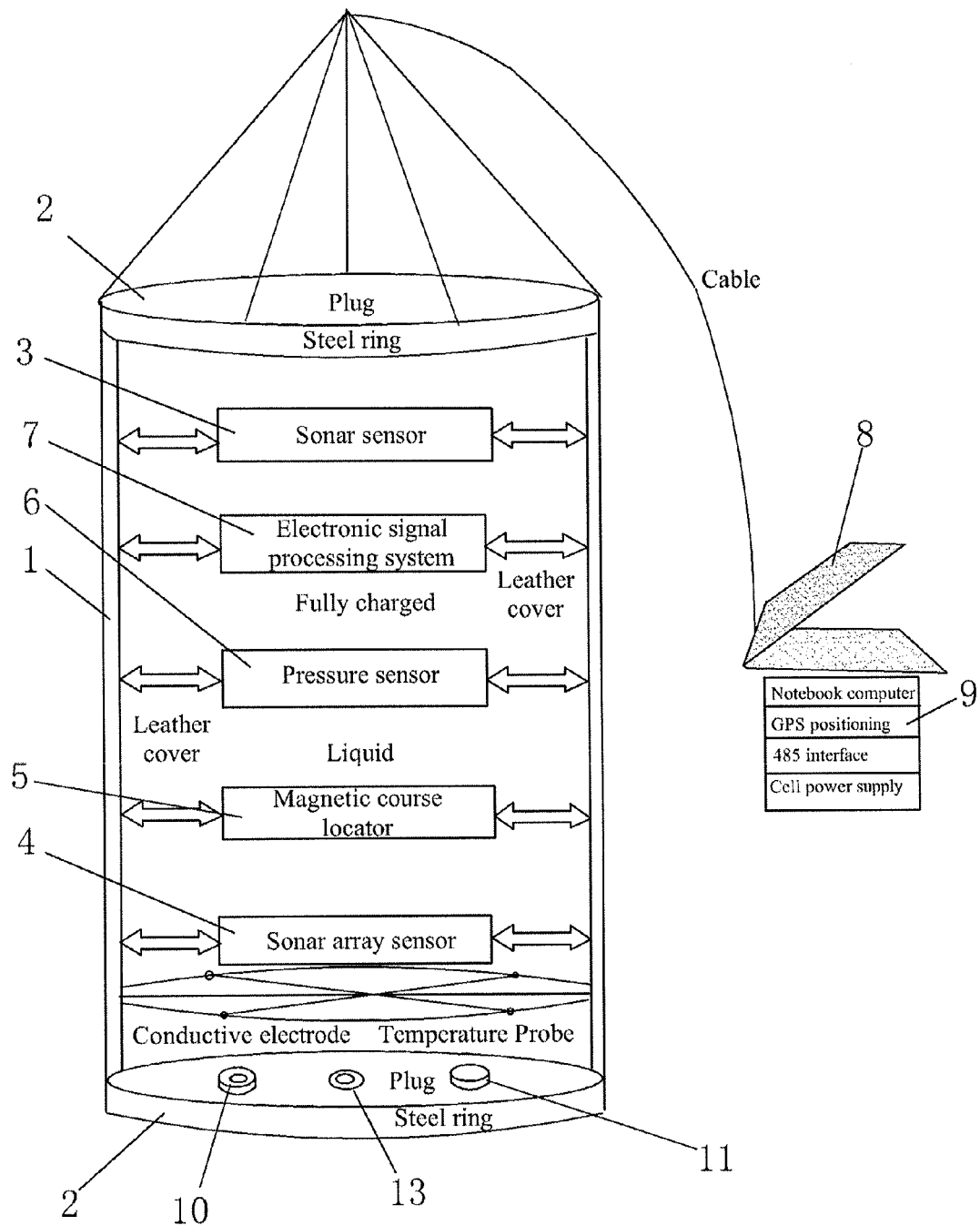
FIG. 2 shows an internal structural schematic diagram of the gauge of the invention.

As shown in FIGS. 1 and 2,

A three-dimensional flow velocity vector, energy and mass gauge is provided, wherein it comprises an elastic leather cover 1, a flow velocity vector and energy measuring device 12, a leakage point mass measuring device 14, computer 8 and GPS locator 9. As shown in FIG. 1, both ends of the elastic leather cover 1 are mounted with a rigid sealing plug 2, separately, the elastic leather cover 1 and the rigid sealing plug 2 forming a cylindrical sealing cavity, in which a cable connecting line hole is installed on the upper rigid sealing plug, while an injection hole for injecting liquid into the cylindrical sealing cavity, on which a sealing plug 13 is provided, is installed on the lower rigid sealing plug. The leather cover 1 should use the leather material similar to the propagation velocity of wave velocity of the water body and has an insulating and solid performance, and can be made of solid and flexible polyurethane material, etc., in the specific implementation. The liquid injected in the leather cover 1 should be similar to the propagation velocity of wave velocity of the water body and be insulating and non-conductive (such as silicone oil). The flow velocity vector and energy measuring device 12 is installed in the above-mentioned cylindrical sealing cavity, and is electrically connected with a computer 8 with a GPS locator 9 via a cable connecting line, obtaining the flowing direction and velocity of underground water by sending the flow sonar obtained by measurement to the computer, thereby determining the flowing vector and energy of underground water; and the leakage point mass measuring device 14 is installed on either or both external surfaces of the above-mentioned two rigid sealing plugs 2, and is electrically connected with the above-mentioned computer 8 via a connecting cable; it determines whether there is loss of water-blocking medium of rock-soil body for the measured point by measuring the change in conductivity and temperature in the underground water and makes timely judgment for the safety of the leakage point.

The flow velocity vector and energy measuring device 12 of the invention comprises: an upper sonar sensor 3, a lower sonar sensor array 4, a course locator 5, a pressure sensor 6 and an electronic signal processing system 7. As shown in FIG. 2, the lower sonar sensor array 4 is used for determining the direction of sound source, and the upper sonar sensor 3 and the sonar sensor which receives the sound source first in the lower sonar sensor array 4 are used for determining the time difference in which the sound source reaches the gauge together; the upper sonar sensor 3 and the sonar sensor in the lower sonar sensor array 4 can be hydrophones, transducers, ceramic hydrophones or fiber hydrophones. There are at least three sonar sensors in the lower sonar sensor array 4, which are uniformly distributed along the edge of the same circumferential plane. The course locator is used for calculating the measuring strength based on the sonar sensor which senses a sound source signal first in the lower sonar sensor array 4 and other nearby sonar sensors in the same array, obtaining the movement direction of the flow vector relative to the gauge, overlapping the measured movement direction of the flow and the geographical North Pole measured by the magnetic course, and obtaining the movement geographical direction of the flow; thereby determining the flow velocity vector measuring position of the next point; the course locator 5 can be a compass, a magnetic sensor, a gyroscope or an electronic gyroscope; the electronic signal processing system 7 is used for receiving the upper sonar sensor 3, the lower sonar sensor array 4, and the course locator 5, the original signal obtained by measurement being converted into the digital signal and being sent to the computer 8 via the cable for processing, in which the system is automatically designed and manufactured with the current electric technology; the GPS locator 9 is connected with a computer 8 for determining the geographic position in which the gauge is located.

The leakage point mass measuring device 14 of the invention comprises a conductive electrode sensor 10 and a temperature sensor 11. The conductive electrode sensor is located on the external surface of the rigid sealing plug 2 and is capable of being in contact with the measured water body so as to send the conductivity and the salinity in the measured water body to the computer 8; the temperature sensor 11 is also located on the external surface of the rigid sealing plug 2 and is capable of being in contact with the measured water body so as to directly send the temperature value in the measured water body to the computer 8, the computer 8 obtaining the mass change of the measuring point based on the change in the measured conductivity and temperature change, wherein if the change rate is larger than a certain value, the leakage deteriorates in the surface measuring point, and a corresponding leaking stoppage measure should be taken to take preventive measures.

Specifically, the conductive electrode sensor 10 can be located in the bottom of the lower rigid sealing plug 2 and is capable of being in contact with the measured water body so as to directly measure the conductivity and the salinity in the water body via two electrodes; the temperature sensor 11 is also located in the bottom of the lower rigid sealing plug 2 and is capable of being in contact with the measured water body so as to directly measure the temperature value in the water body via a temperature sensor. Through the measurement of the conduction and the temperature value, as well as the measured vector and energy, it can track and monitor the space distribution of the degree of mineralization, salinity, and volume-weight of water, temperature and other mass quantitative indexes of the water entity of the flow velocity mass point in real time when being driven by the energy. Furthermore, since the flow velocity vector of the underground water synchronously measured on the site and in situ and the increment of chemical substances in the water body driven by the flow velocity vector change (it can use the method disclosed in 201110295635.5), a series of critical technical issues to be addressed in the civil engineering leakage are quantitatively solved from the monitor of the energy and mass variation. Before destructive hidden danger appears in the underground engineering, it makes prediction and forecast and takes preventive measures, such as leakage of reservoir dams, piping leakage of river dams, water-stop structure mass detection of the underground continuous wall bodies, underground water solute transport and diffusion measurement, etc.; the upper sonar sensor 3, the lower sonar sensor array 4, the course locator 5 and electronic signal processing system 7 are all installed and located in the cylindrical sealing cavity; the GPS locator 9, the computer 8, 485 interface and the ground power supply are all located out of the cylindrical sealing cavity and are connected with the electronic signal processing system 7 in the cylindrical sealing cavity via a cable. When the gauge of the invention is used for detecting the leakage point of the reservoir, a pressure sensor 6 should also be installed in the cylindrical sealing cavity so as to determine the depth of the water level in which the gauge is located. The pressure sensor 6 can use a resistive, capacitive, piezoresistive or piezoelectric pressure sensor.

Figure 3:
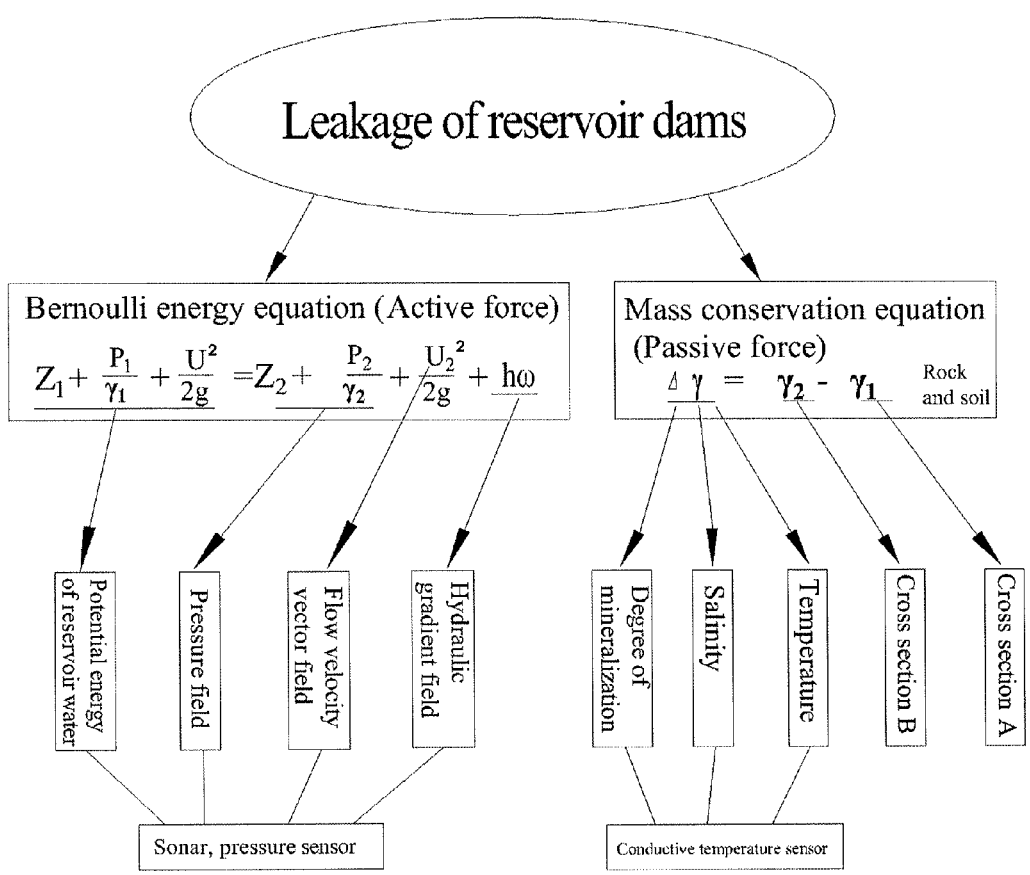
FIG. 3 shows an application diagram of the invention in the reservoir dam leakage monitoring.

The application of the invention in the leakage measurement of reservoir dams is as shown in FIG. 3. The leakage point can be positioned through the sonar, pressure sensor, magnetic course device in the flow velocity vector and energy measuring device of the invention in combination with Bernoulli energy equation. Whether the leakage hole of the leakage point will be expanded and whether piping will occur can be determined through the change rate of the leakage point conductivity and the variation of the temperature. This will provide the first-hand information to take remedial measures timely and provide an important basis for preventing and avoiding the occurrence of the dam break. It is very important to improve the safety of the reservoir dams.

The content that is not mentioned in the invention is the same as the existing technology or can be achieved with the existing technology.

The invention claimed is:

1. A three-dimensional flow velocity vector, energy and mass gauge comprising:
   an elastic leather cover, both ends of which are mounted with a rigid sealing plug, separately, the elastic leather cover and the rigid sealing plug forming a cylindrical sealing cavity, in which a cable connecting line hole is installed on the upper rigid sealing plug, while an injection hole for injecting liquid into the cylindrical sealing cavity, on which a sealing plug is provided, is installed on the lower rigid sealing plug;
   a flow velocity vector and energy measuring device, which is installed in the cylindrical sealing cavity, and is electrically connected with a computer with a GPS locator via a cable connecting line, obtaining a flowing direction and velocity of underground water by sending a sonar signal obtained by measurement to the computer; and
   a leakage point mass measuring device, which is installed on either or both external surfaces of the two rigid sealing plugs, and is electrically connected with the computer via a connecting cable, wherein the device determines whether there is loss of rock-soil for a measured point by measuring a change in conductivity and temperature in the underground water, and consequently makes a judgment whether the measured point is considered safe.

2. The three-dimensional flow velocity vector, energy and mass gauge according to claim 1, wherein the flow velocity vector and energy measuring device comprises:
   an upper sonar sensor and a lower sonar sensor array, wherein the lower sonar sensor array is used for determining the direction of sound source, and the upper sonar sensor and the sonar sensor which receives the sound source first in the lower sonar sensor array are used for determining the time difference in which the sound source reaches the gauge together;
   a course locator, which is used for calculating a strength of the sonar signal based on the sonar sensor which senses a sound source signal first in the lower sonar sensor array and other nearby sonar sensors in the same array, obtaining the movement direction of the flow relative to the gauge, overlapping the measured movement direction of the flow and the geographical North Pole measured by the magnetic course, and obtaining the movement geographical direction of the flow; thereby determining the flow velocity vector measuring position of another measured point;
   a pressure sensor, which is installed in the cylindrical sealing cavity for determining the depth of the water level in which the gauge is located so as to determine the position of the gauge; and an electronic signal processing system, which is used for receiving signals from the upper sonar sensor, the lower sonar sensor array, the course locator, the pressure sensor, a conductive electrode sensor and a temperature sensor, the original signal being converted into at least one digital signal, and the system sending the at least one digital signal to the ground-based computer via the cable for processing, thereby obtaining the flowing direction and velocity of the underground water of the measuring point.

3. The three-dimensional flow velocity vector, energy and mass gauge according to claim 2, wherein the course locator is a compass, a magnetic sensor, a gyroscope or an electronic gyroscope.

4. The three-dimensional flow velocity vector, energy and mass gauge according to claim 2, wherein there are at least three sonar sensors in the lower sonar sensor array, which are uniformly distributed along the edge of the same circumferential plane.

5. The three-dimensional flow velocity vector, energy and mass gauge according to claim 1, wherein the leakage point mass measuring device comprises:
 a conductive electrode sensor, which is located on the external surface of the rigid sealing plug and is capable of being in contact with a measured water body so as to send the conductivity and the salinity in the measured water body to the computer; and
 a temperature sensor, which is also located on the external surface of the rigid sealing plug and is capable of being in contact with the measured water body so as to directly send the temperature value in the measured water body to the computer, the computer obtaining a change of mass of water at the measuring point based on the change in the conductivity and the salinity in the measured water body.

6. The three-dimensional flow velocity vector, energy and mass gauge according to claim 5, wherein the conductive electrode sensor is a graphite, stainless steel, titanium alloy or platinum electrode sensor.

7. The three-dimensional flow velocity vector, energy and mass gauge according to claim 5, wherein the temperature sensor is a thermocouple, a thermistor, a resistance temperature detector (RTD) or an IC temperature sensor.

8. The three-dimensional flow velocity vector, energy and mass gauge according to claim 1, wherein the leather cover includes a leather material having a sound propagation velocity similar to a sound propagation velocity of water and has an insulating and solid performance.

9. The three-dimensional flow velocity vector, energy and mass gauge according to claim 1, wherein liquid injected in the leather cover has a propagation velocity similar to a propagation velocity of water and is insulating and non-conductive.

* * * * *